(12) United States Patent
Yashin et al.

(10) Patent No.: US 10,794,517 B2
(45) Date of Patent: Oct. 6, 2020

(54) SYSTEM, METHOD AND APPARATUS FOR EXPANSION COUPLING FOR PIPES WITH SHEATHED GROOVES

(71) Applicant: North American Pipe Corporation, Houston, TX (US)

(72) Inventors: Dmitry Yashin, Haverford, PA (US); Joshua E. Clapper, Downingtown, PA (US)

(73) Assignee: NORTH AMERICAN PIPE CORPORATION, Houston, TX (US)

(*) Notice: Subject to any disclaimer, the term of this patent is extended or adjusted under 35 U.S.C. 154(b) by 403 days.

(21) Appl. No.: 15/908,624

(22) Filed: Feb. 28, 2018

(65) Prior Publication Data

US 2018/0245722 A1   Aug. 30, 2018

Related U.S. Application Data

(60) Provisional application No. 62/465,095, filed on Feb. 28, 2017.

(51) Int. Cl.
   *F16L 21/02*     (2006.01)
   *F16L 41/02*     (2006.01)

(52) U.S. Cl.
   CPC ........... *F16L 21/022* (2013.01); *F16L 41/021* (2013.01); *F16L 2201/10* (2013.01)

(58) Field of Classification Search
   CPC ..... F16L 21/022; F16L 21/03; F16L 37/1235; F16L 37/12; F16L 37/1225; F16L 37/14; F16L 37/142; F16L 37/144; F16L 37/146; F16L 37/148

USPC .......................................... 285/305, 335, 374
See application file for complete search history.

(56) References Cited

U.S. PATENT DOCUMENTS

| 3,282,610 | A | * | 11/1966 | White | F16L 21/03 |
| --- | --- | --- | --- | --- | --- |
| | | | | | 285/18 |
| 3,447,819 | A | * | 6/1969 | Borsum | F16L 37/0982 |
| | | | | | 285/111 |
| 4,687,232 | A | | 8/1987 | Zimmerman | |
| 5,816,625 | A | | 10/1998 | Clarke | |
| 6,679,528 | B1 | * | 1/2004 | Poder | F16L 33/18 |
| | | | | | 285/23 |
| 7,111,873 | B1 | | 9/2006 | Coogle | |
| 7,963,569 | B2 | | 6/2011 | Subbaraman et al. | |
| 8,025,315 | B2 | * | 9/2011 | Schreckenberg | F16L 13/142 |
| | | | | | 285/248 |
| 8,313,607 | B2 | | 11/2012 | Quinn | |
| 8,764,066 | B1 | | 7/2014 | Rice et al. | |
| 9,638,364 | B2 | * | 5/2017 | Mueller | F16D 25/00 |
| 2003/0001386 | A1 | * | 1/2003 | Cresswell | F16L 37/0887 |
| | | | | | 285/305 |

(Continued)

*Primary Examiner* — Aaron M Dunwoody
(74) *Attorney, Agent, or Firm* — Lempia Summerfield Katz LLC

(57) ABSTRACT

A pipe system can include a coupling having an axis, axial ends and a bore. Each axial end can include a coupling spline groove formed in the bore, and a seal groove axially inboard of the coupling spline groove. The seal groove can be configured to house a seal. At least two pipes can be configured to be inserted into different axial ends of the coupling and be secured therein with retainers. Each pipe can include a pipe spline groove, a band groove axially adjacent to and radially shallower than the pipe spline groove, and a band mounted in the band groove.

20 Claims, 12 Drawing Sheets

(56) References Cited

U.S. PATENT DOCUMENTS

| | | | | |
|---|---|---|---|---|
| 2007/0246936 A1* | 10/2007 | Jeltsch | ................ | H02G 3/0691 |
| | | | | 285/319 |
| 2008/0302618 A1* | 12/2008 | Tulaczko | .............. | F16L 37/142 |
| | | | | 188/266 |
| 2010/0269956 A1* | 10/2010 | Iida | ................... | H01M 8/04201 |
| | | | | 141/311 R |
| 2013/0180610 A1* | 7/2013 | McGowan | ............ | F16L 37/148 |
| | | | | 137/613 |
| 2013/0207381 A1* | 8/2013 | Morrison | ............ | F16L 37/0842 |
| | | | | 285/82 |
| 2018/0180203 A1* | 6/2018 | Yashin | ................... | F16L 21/03 |

* cited by examiner

SYSTEM, METHOD AND APPARATUS FOR EXPANSION COUPLING FOR PIPES WITH SHEATHED GROOVES

This application claims priority to and the benefit of U.S. Prov. Pat. App. No. 62/465,095, filed Feb. 28, 2017, and is incorporated herein by reference in its entirety.

BACKGROUND OF THE INVENTION

Field of the Disclosure

The present invention relates in general to pipes and, in particular, to a system, method and apparatus for an in-line removable coupling for pipes with sheathed grooves.

Description of the Prior Art

Conventional, restrained pipe joint systems typically have removable splines that are inserted into pipes or pipe and coupling joints to complete the pipe assembly. On occasion, portions of the pipe assembly must be repaired or replaced. This typically entails disassembling the affected portion of the pipe assembly, and then having to axially move the entire pipeline on either side of the affected portion to uncouple one or more joints. After the new pipe and/or coupling is installed, the entire pipeline is axially moved back to its original position to couple the new components into the pipeline assembly. Although this solution is workable, improvements in pipeline couplings continue to be of interest.

SUMMARY

Embodiments of a system, method and apparatus for a coupling for forming a joint with at least two pipes. For example, a pipe system can include a coupling having an axis, axial ends and a bore. Each axial end can include a coupling spline groove formed in the bore, and a seal groove axially inboard of the coupling spline groove. The seal groove can be configured to house a seal. At least two pipes can be configured to be inserted into different axial ends of the coupling and be secured therein with retainers. Each pipe can include a pipe spline groove, a band groove axially adjacent to and radially shallower than the pipe spline groove, and a band mounted in the band groove.

Embodiments of a method of forming a pipe assembly can include providing a coupling with an axis, a bore, a coupling spline groove and a seal groove having a seal, and a pipe having a pipe spline groove and a recess with a band; axially moving the coupling and the pipe relative to each other such that the pipe enters the bore; contacting the band with the seal such that the seal axially slides the band away from the recess and over the pipe spline groove, so that the seal does not enter the pipe spline groove as the seal axially passes the pipe spline groove; moving the coupling and the pipe relative to each other in an axially opposite direction such that the pipe begins exiting the bore; and then contacting the band with the seal such that the seal axially slides the band back toward the recess and exposes the pipe spline groove, so that the seal does not enter the pipe spline groove as the seal axially passes the pipe spline groove.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

The use of the same reference symbols in different drawings indicates similar or identical items.

DETAILED DESCRIPTION

Figure 1:
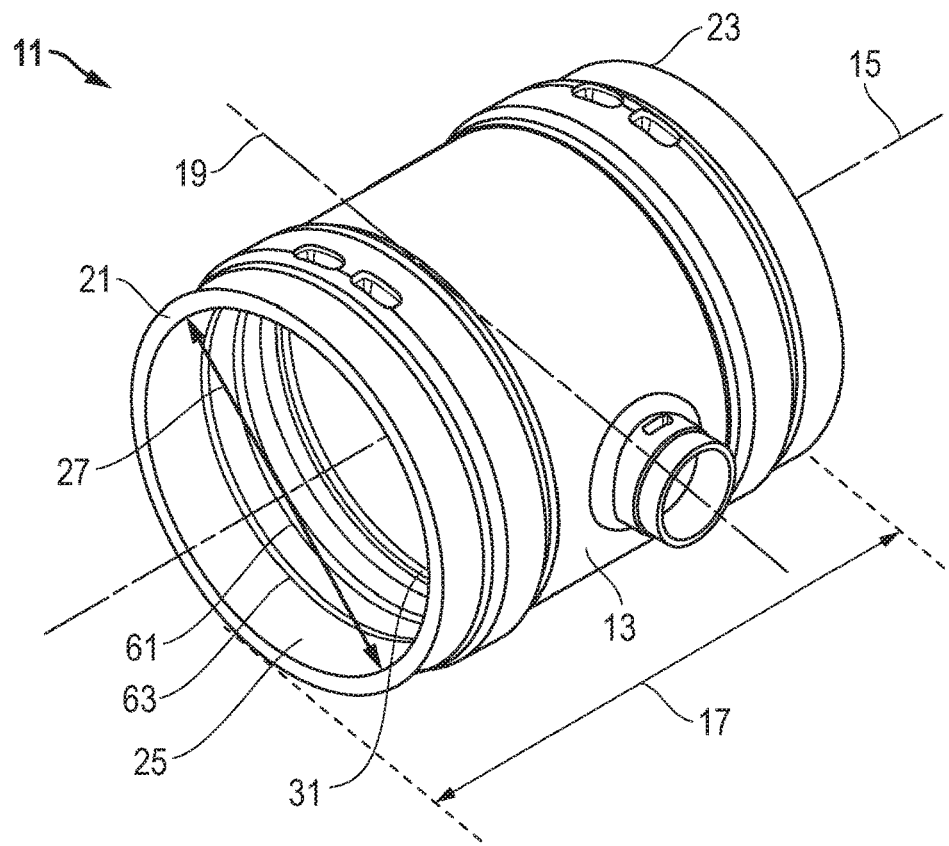
FIG. 1 is an isometric view of an embodiment of a coupling.
Figure 2:
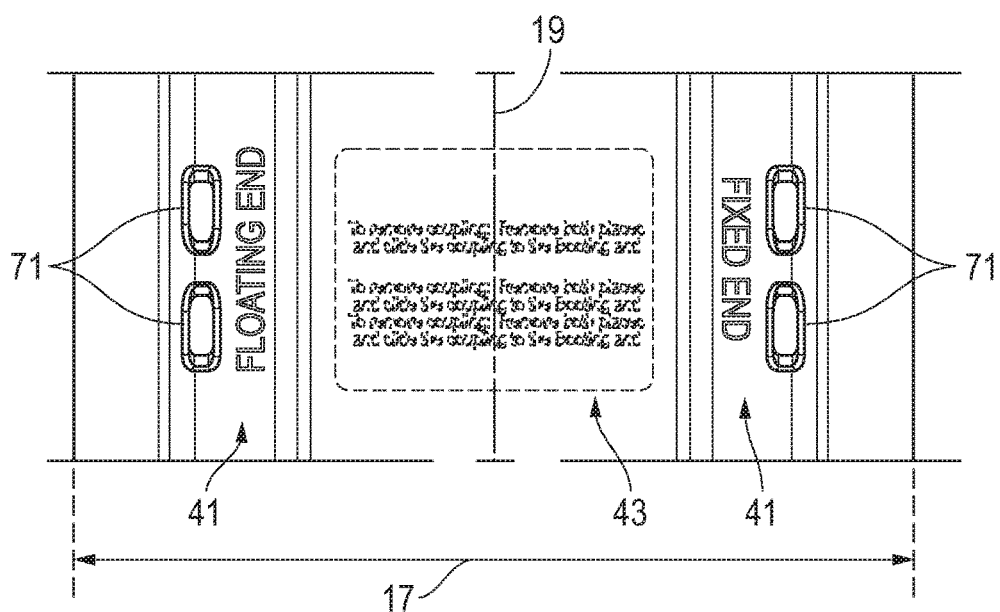
FIG. 2 is a top view of an embodiment of the coupling of FIG. 1.

FIGS. 1 and 2 depict isometric and top views of an embodiment of a portion of a tubular member, such as a coupling 11. Although the coupling 11 is depicted as a tee (e.g., for connecting up to three pipes), the coupling 11 can comprise alternate embodiments, such as a fitting, a straight coupling 111 (FIGS. 7-10) for connecting only two pipes, an elbow, a plug, a sweep or still other types of connectors known to those of ordinary skill in the art. The coupling 11 can be configured to freely axially release the pipes from the axial ends from which the pipes are configured to protrude.

Figure 3:
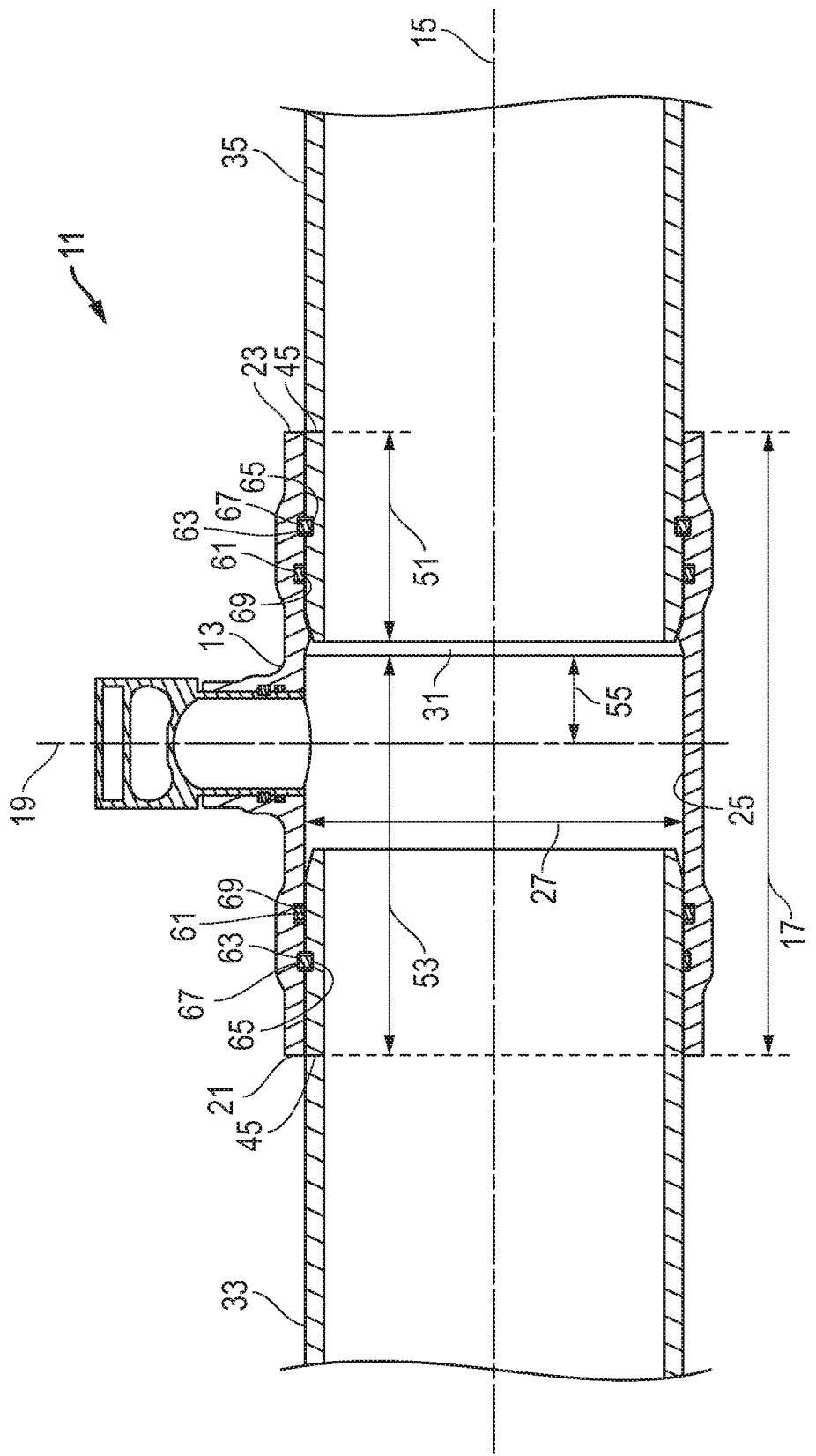
FIG. 3 is a sectional side view of an embodiment of a pipe assembly with the coupling of FIG. 1.
Figure 4:
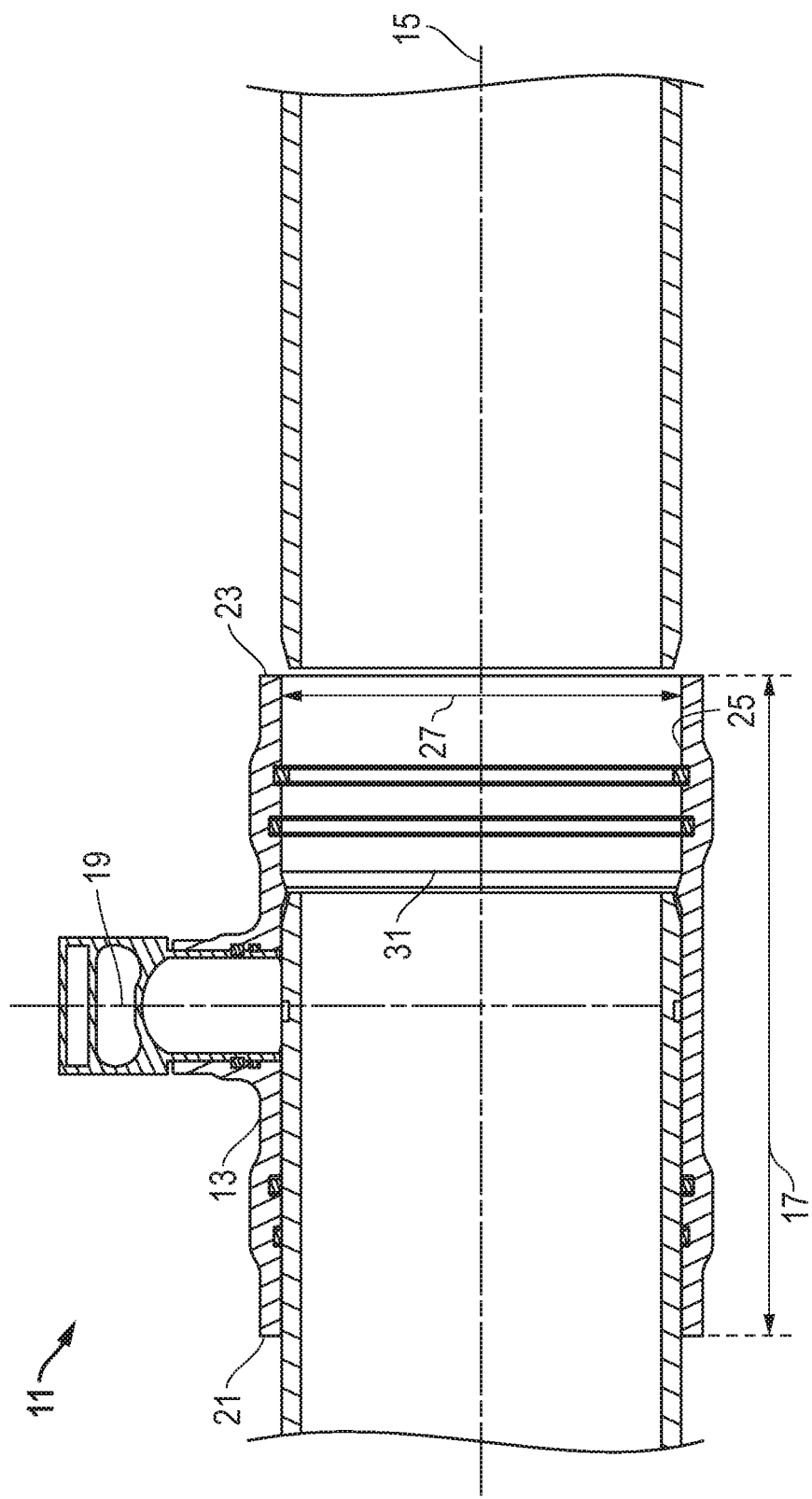
FIG. 4 is a sectional side view of an initial stage of disassembly of the pipe assembly of FIG. 3.
Figure 5:
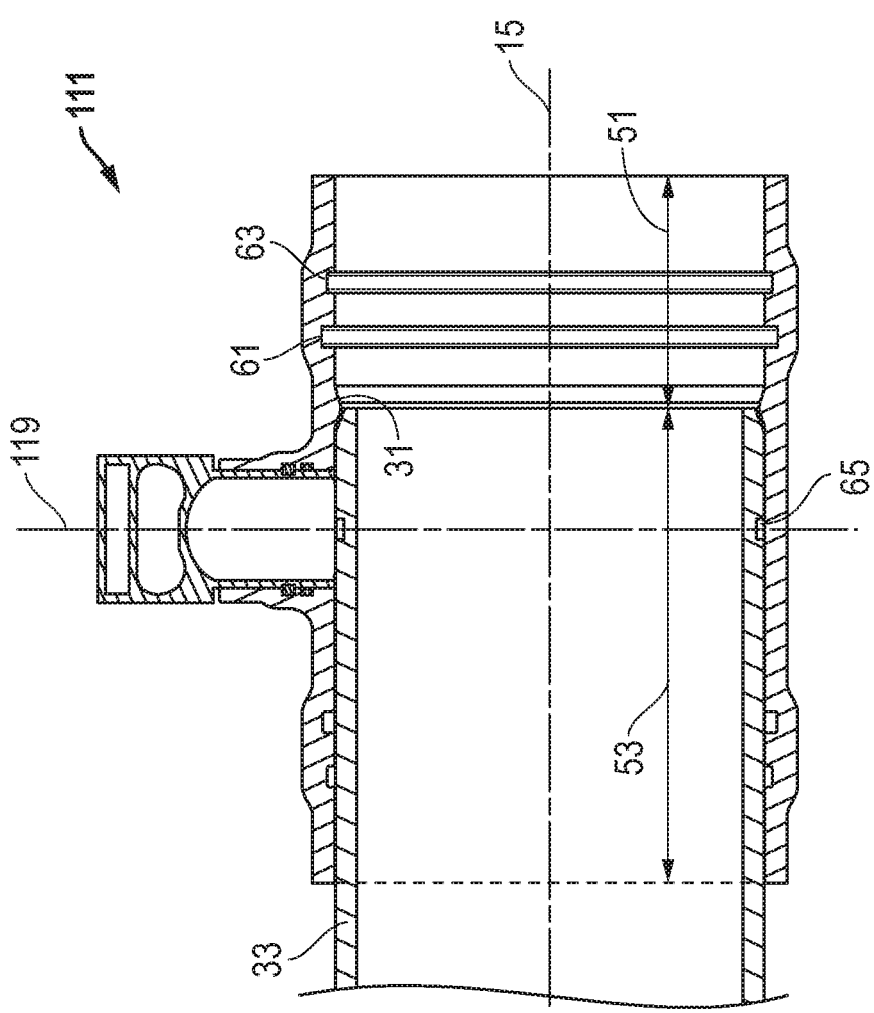
FIG. 5 is a sectional side view of an intermediate stage of disassembly of the pipe assembly of FIG. 4.
Figure 6:
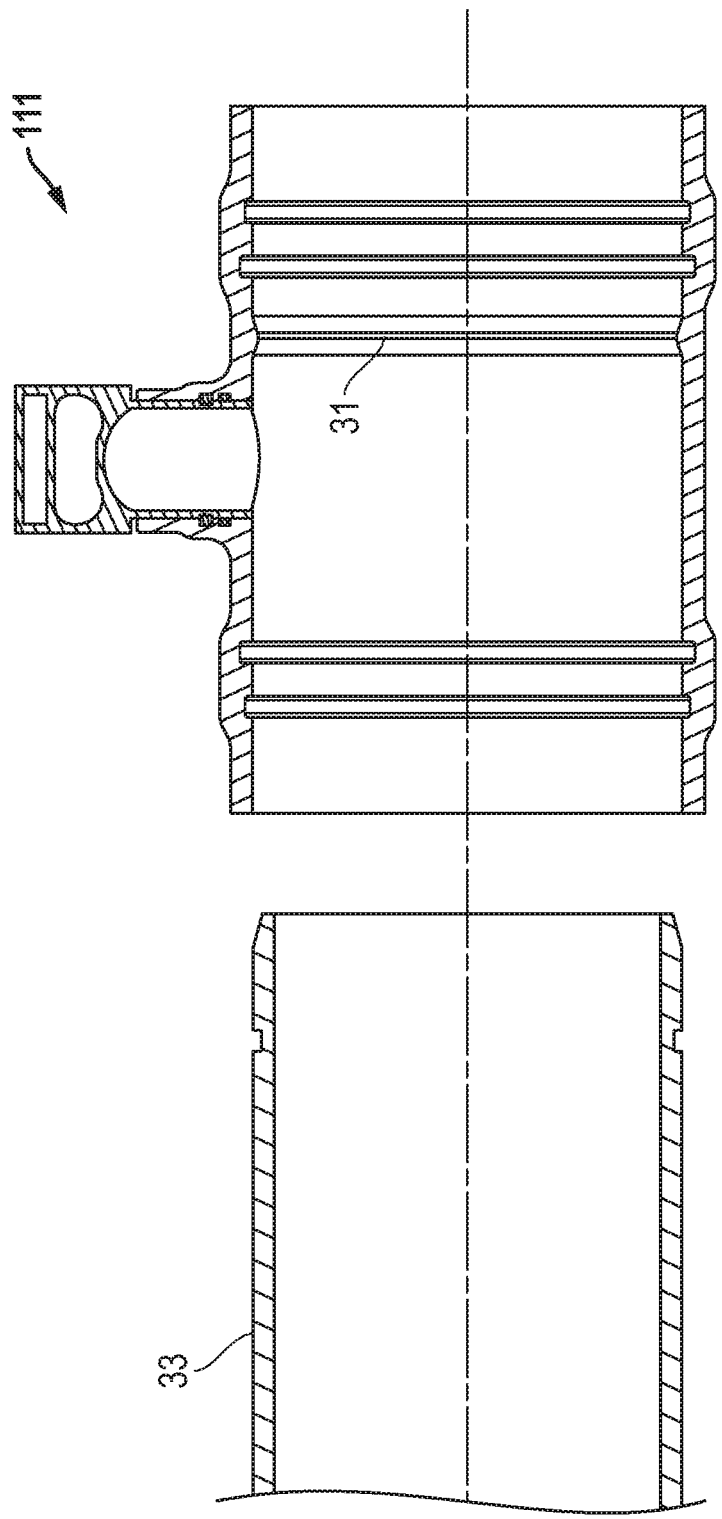
FIG. 6 is a sectional side view of a subsequent stage of disassembly of the pipe assembly of FIG. 5.
Figure 7:
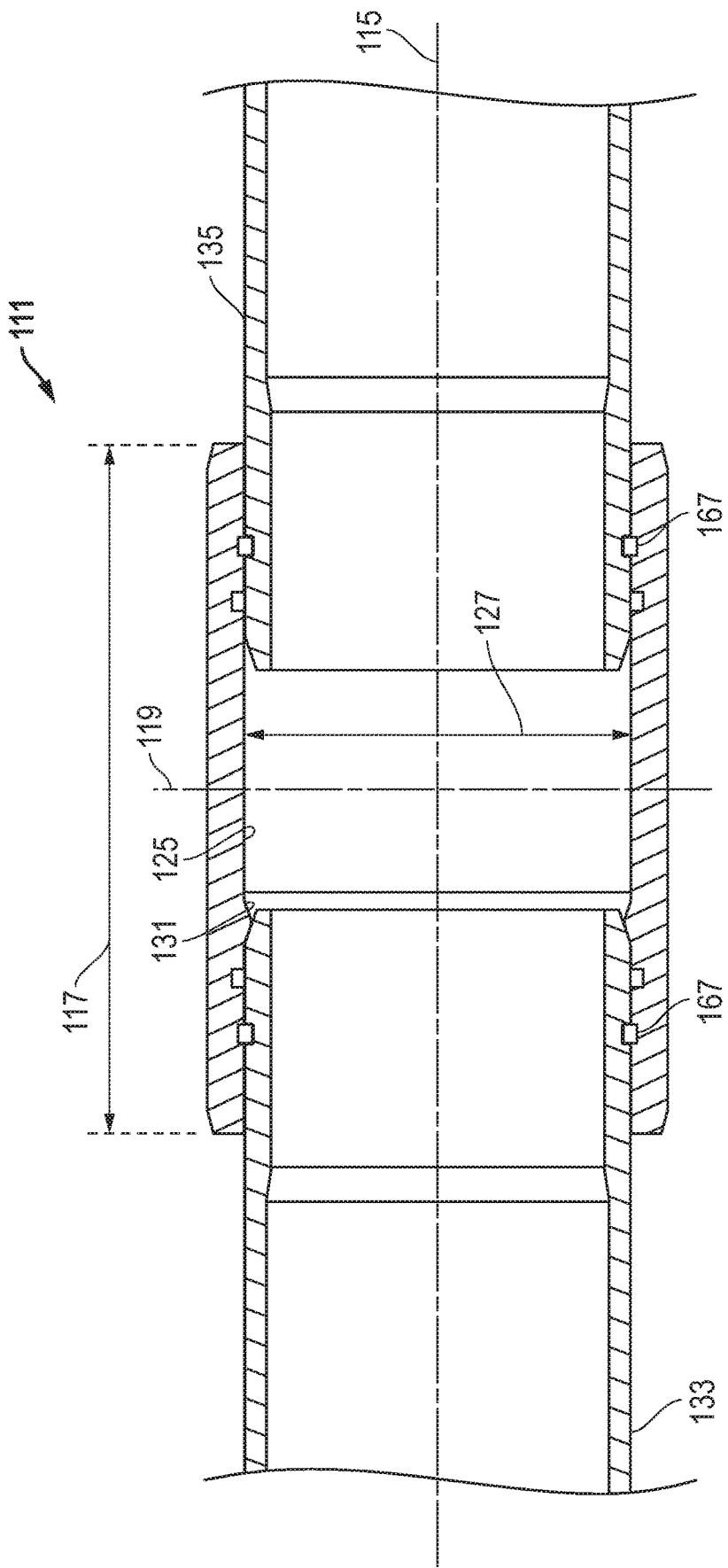
FIG. 7 is a sectional side view of another embodiment of a pipe assembly.

The coupling 11 can include a coupling body 13 having an axis 15, an axial length 17, an axial center 19 and axial ends 21, 23. In addition, coupling 11 can include an inner surface 25 having an inner diameter 27 that is substantially constant over an entirety of the axial length 17. Embodiments of coupling 11 also can include a shoulder 31. Shoulder 31 can protrude radially inward relative to the axis 15 from the inner surface 25 to limit axial movement of pipes 33, 35 (FIG. 3). Shoulder 31 can be the only radially inward-protrusion from inner surface 25, such that the inner surface 25 has no other shoulders. Examples of shoulder 31 can include a mechanical stop comprising one of a rectangular hard stop and a chamfered stop. In one version, the shoulder 31 can be configured to limit axial insertion of both pipes 33, 35, such that the pipes 33, 35 can be configured to never make contact with each other inside the coupling 11 due to the presence of the shoulder 31. Versions of the shoulder 31 may not be axially aligned with the axial center 19 of the coupling body 13.

FIG. 3 depicts an installed configuration for coupling 11. In some embodiments, the shoulder 31 can be configured to substantially remain in contact with only one of the pipes 35, such that the other pipe 33 is free of contact with the shoulder 31. In some examples, the pipe 35 can slightly axially retract (e.g., up to about ¼ inch) from contact with shoulder 31 after installation.

As best shown in FIG. 2, an exterior of the coupling 11 can include visual indicia 41 to indicate a location of the shoulder 31 from the exterior of the coupling 11. For example, the visual indicia 41 can comprise text configured to describe pipe position (e.g., "FIXED END" for pipe 35, and "FLOATING END" for pipe 33). In some versions, forms of instructions 43 can be included for pipe installation and pipe removal. Such instructions 43 can be molded or stamped with coupling 11 during its original manufacture. Alternatively or in addition, the pipes 33, 35 themselves can include visual indicia 45 configured to indicate correct depth of axial insertion of the pipes 33, 35 in the coupling 11. Versions of the visual indicia 45 can comprise, for example, a line or shallow groove circumscribing the pipes 33, 35 adjacent axial ends thereof.

In some embodiments, an axial centerline of the shoulder 31 (FIG. 3) can be axially spaced apart from one axial end 23 by a first distance 51. The axial centerline of the shoulder 31 can be axially spaced apart from the other second axial end 21 by a second distance 53, and the second distance 53 can be at least about twice the first distance 51.

Versions of the coupling 11 can include the axial centerline of the shoulder 31 being axially spaced apart from the axial center 19 of the coupling 11 by a distance 55 of at least about 1% of the coupling axial length 17. In other versions, that distance 55 can be at least about 5%, such as at least about 10%, at least about 20%, or even at least about 25% of the coupling axial length 17. In still other versions, the axial centerline of the shoulder 31 can be axially spaced apart from the axial center 19 of the coupling 11 by the distance 55 of not greater than about 50%, such as not greater than about 45%, not greater than about 40%, not greater than about 35%, or even not greater than about 30%. Such a distance 55 can be defined in a range between any of the foregoing values.

The coupling 11 can comprise one or more seal grooves 61 and/or retaining ring grooves, such as spline grooves 63. Versions of pipe 33, 35 can comprise only a pipe retaining ring groove, such as pipe spline groove 65, but not a pipe seal groove. The coupling 11 can be configured to retain the pipes 33, 35 with retainers, such as retaining rings or splines 67, and sealed with seals 69 in an installed configuration. In some embodiments, no other fittings are required to form the joint between the coupling 11 and the pipes 33, 35 other than splines 67 and seals 69. Versions of the coupling 11 can include installing the splines 67 only from an exterior of the coupling 11, such as through spline holes 71 (FIG. 2). Examples of the coupling 11 and the pipes 33, 35 may not be threaded.

Other forms of retaining rings can comprise pinch-type rings or clamps. Such rings or clamps can have a nominal or "rest" configuration, wherein they define a first diameter to retain one element on another element. The rings or clamps also can have a pinched or expanded configuration, wherein they define a second diameter that is greater than the first diameter to release one element from another element. The rings or clamps can have projections that extend radially beyond a perimeter thereof. When the projections are squeezed or pinched toward each other, the ring or clamp moves from the nominal configuration to the expanded configuration.

Some embodiments of the coupling 11 and/or pipes 33, 35 can comprise or consist of one or more polymers (e.g., polyvinylchloride, or PVC. Coupling 11 and pipes 33, 35 can be injection molded, or extruded and machined. The pipes 33, 35 can be configured to be identical to each other. Versions of the pipes 33, 35 can have a substantially constant outer diameter, other than axial tips thereof, which can be chamfered as shown. In some examples, the coupling 11 can be configured to not prevent rotation of the pipes 33, 35 relative to each other and to the coupling 11.

Embodiments of a pipe system can include the coupling 11, axis 15, axial ends 21, 23, an interior or inner surface 25, and an axial-facing portion in the interior, such as shoulder 31. At least two pipes 33, 35 can be configured to be inserted into different axial ends 21, 23 of the coupling 11 and secured therein with splines 67. The axial-facing portion of the coupling 11 (e.g., shoulder 31) can be configured to substantially remain in contact with only one of the pipes 35. The other pipe 33 may not axially abut, either directly or indirectly, any axial-facing portion (e.g., shoulder 31) of the coupling 11 in the installed position other than through a respective spline 67. Thus, pipe 33 only radially abuts the coupling 11 with respect to the axis 15.

Moreover, the axial-facing portion (e.g., shoulder 31) can comprise or consist of the only axial-facing portion in the interior of the coupling 11 other than spline grooves 63 and seal grooves 61. The coupling 11 can include an inner diameter 27 that is substantially constant over an entirety of the axial length 17 other than the spline and seal grooves 63, 61. The axial-facing portion can comprise or consist of a single shoulder 31 protruding radially inward relative to the axis 15 from the interior, such that the interior has no other shoulders. As noted herein, shoulder 31 (i.e., the axial-facing portion) may not axially align with the axial center 19 of the coupling 11. Other features and elements of the axial-facing portion can include those described for shoulder 31.

In other examples, the coupling 11 can include a first pipe axial insertion depth 51, a second pipe axial insertion depth 53, and spline grooves 63. The second pipe axial insertion depth 53 can be at least about double the first pipe axial insertion depth 51. The coupling 11 can be configured to directly physically engage two identical pipes 33, 35.

FIGS. 7-10 depict an embodiment of a pipe system having coupling 111 with an axis 115, an axial length 117, an axial center 119, and an interior 125 with an inner diameter 127 that is substantially constant over an entirety of the axial length 117. A single shoulder 131 can protrude radially inward from the inner diameter 127, such that the coupling has no other shoulders in the interior 125. In addition, the single shoulder 131 can be not axially aligned with the axial center 119 of the coupling 111. At least two pipes 133, 135 can be configured to be mounted to the coupling 111.

Figure 8:
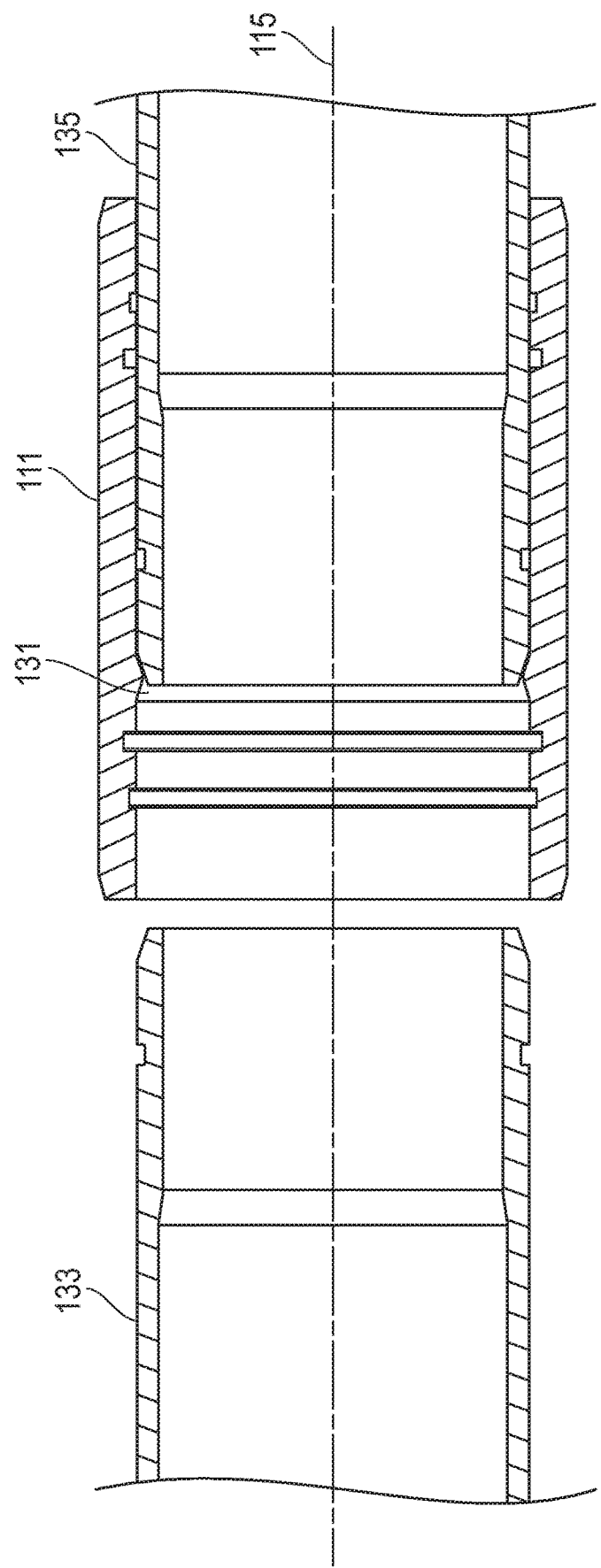
FIG. 8 is a sectional side view of an initial stage of disassembly of the pipe assembly of FIG. 7.
Figure 9:
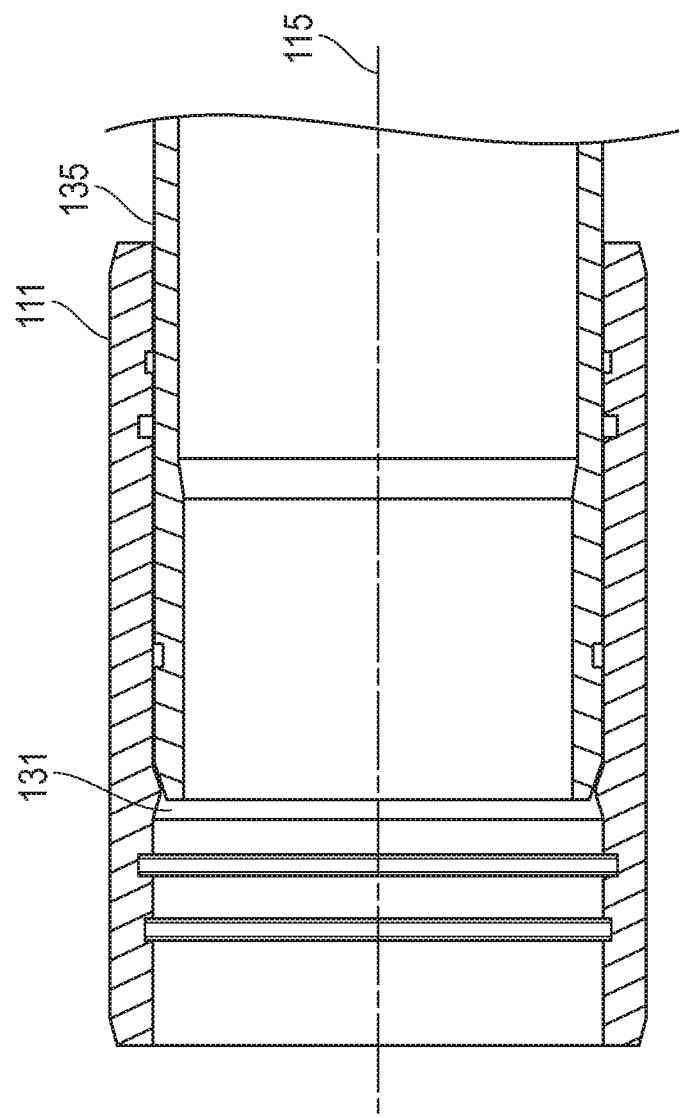
FIG. 9 is a sectional side view of an intermediate stage of disassembly of the pipe assembly of FIG. 8.
Figure 10:
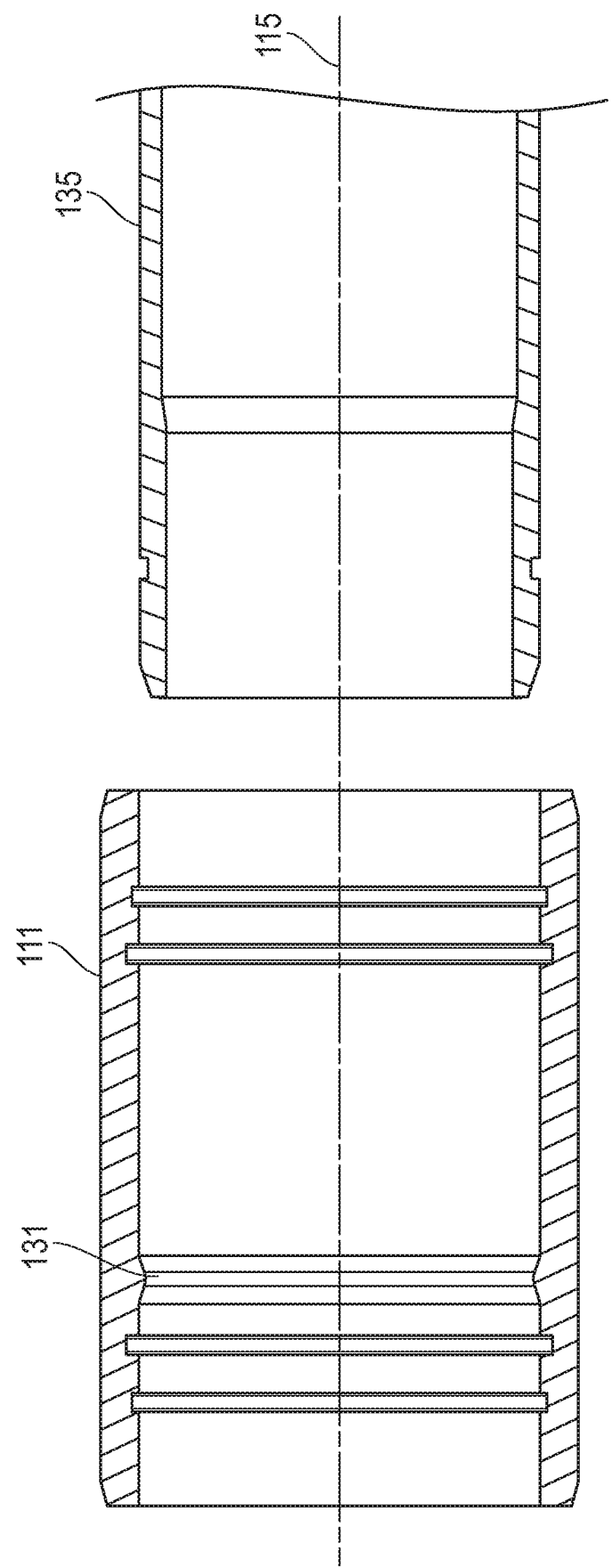
FIG. 10 is a sectional side view of a subsequent stage of disassembly of the pipe assembly of FIG. 9.

Embodiments of a method of replacing pipe in a pipe assembly can include the following actions: providing the pipe assembly with an axis 115 and a plurality of pipes 133, 135 secured to a plurality of couplings 111 (for simplicity, only one shown) with splines 167; removing the splines 167 from a selected coupling 111 having a "good" pipe 135 and a "bad" pipe 133 in need of replacement, and removing the spline (not shown) from an adjacent coupling splined to the bad pipe 133. As shown in FIG. 8, the method continues by axially sliding the selected coupling 111 over the good pipe 135 until the good pipe 135 contacts a shoulder 131 in the selected coupling 111, such that the bad pipe 133 is exposed from the selected coupling 111. In FIG. 9, the bad pipe 133 is moved off-axis 115 (e.g., out of view) from the selected coupling 111, and the bad pipe 133 is removed from the adjacent coupling (not shown). The method can continue by installing a new pipe (not shown), in place of the bad pipe 133, by inserting the new pipe into the adjacent coupling (not shown), moving the new pipe on-axis with the selected coupling 111, and axially sliding the selected coupling onto the new pipe.

Under some circumstances, pipe assemblies can be incorrectly installed in the field. For example, for a pipe assembly comprising couplings 111, all of the couplings should be oriented in a same direction (i.e., with shoulders 131 always on the downstream side of the pipe assembly). However, for those situations where two adjacent couplings 111 are installed with shoulders 131 oriented toward each other, embodiments of method of replacing pipe in such a pipe assembly also are disclosed. For example, the method can include providing the pipe assembly with an axis and a plurality of pipes secured to a plurality of couplings with splines; removing the splines from a selected coupling having a good pipe and a bad pipe in need of replacement, and removing the splines from an adjacent coupling splined to the bad pipe, the adjacent coupling having a second good pipe; axially sliding the selected coupling over the good pipe until the good pipe contacts a shoulder in the selected coupling, and axially sliding the adjacent coupling over the second good pipe until the second good pipe contacts a second shoulder in the adjacent coupling, such that the bad pipe is exposed from the selected coupling and the adjacent coupling; removing the bad pipe from the selected coupling and the adjacent coupling; and then installing a new pipe, in place of the bad pipe, by axially sliding the selected coupling and the adjacent coupling onto the new pipe.

In addition, there can situations in the field where the pipes are good but the coupling is in need of replacement. For such situations, one method of replacing a component in a pipe assembly can include providing a pipe assembly with an axis and a plurality of pipes secured to a plurality of components with splines; removing the splines from a bad component in need of replacement, the bad component having first and second pipes; axially sliding the bad component over the first pipe until the first pipe contacts a shoulder in the bad component, such that the second pipe is exposed from the bad component; moving the second pipe off-axis relative to the bad component; removing the bad component from the first pipe; and then installing a new component, in place of the bad component, by axially inserting the new component onto the first pipe, repositioning the second pipe on-axis relative to the new component, and axially sliding the new component onto the second pipe.

A version of the coupling body can comprise spline grooves, each of the pipes can include a pipe spline groove and a pipe seal groove, and the coupling can be configured to retain the pipes with splines in an installed configuration. In another version, the pipes can be configured to make contact with each other inside the coupling despite the presence of the single shoulder.

Figure 11:
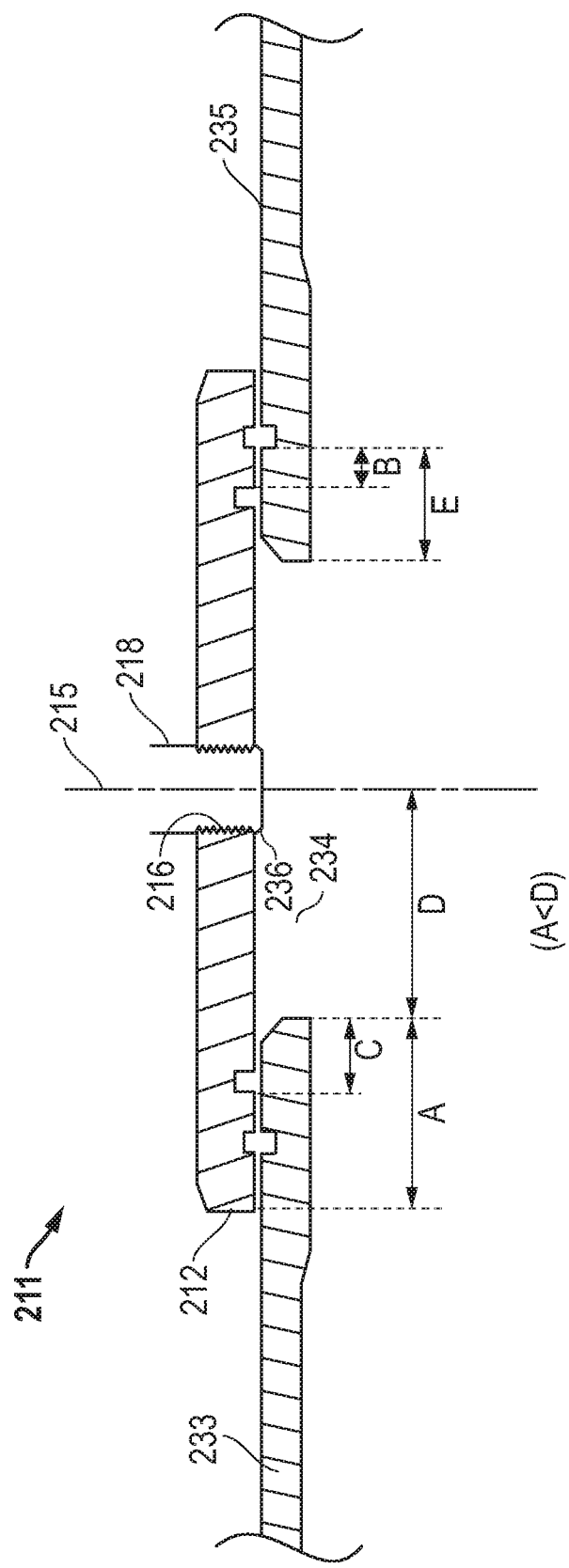
FIG. 11 is a schematic, half-sectional view of an embodiment of a pipe assembly.

FIG. 11 depicts an embodiment of a coupling 211 an axial center 215 of the coupling 211 comprises a tapped hole 216 configured for connection to a component 218. The tapped hole 216 can be configured to be plugged when the component 218 is not used. In some versions, the component 218 comprises a tee or a wye. Pipes 233, 235 can engage coupling 211. FIG. 11 also defines a distance A as an axial overlap distance from one of the coupling axial ends 212 to a respective pipe axial end 234. A distance D can be defined as an axial separation distance from one of the pipe axial ends 234 to a stop 236, such as the component 218, the single shoulder, etc. In an example, D>A.

Figure 12:
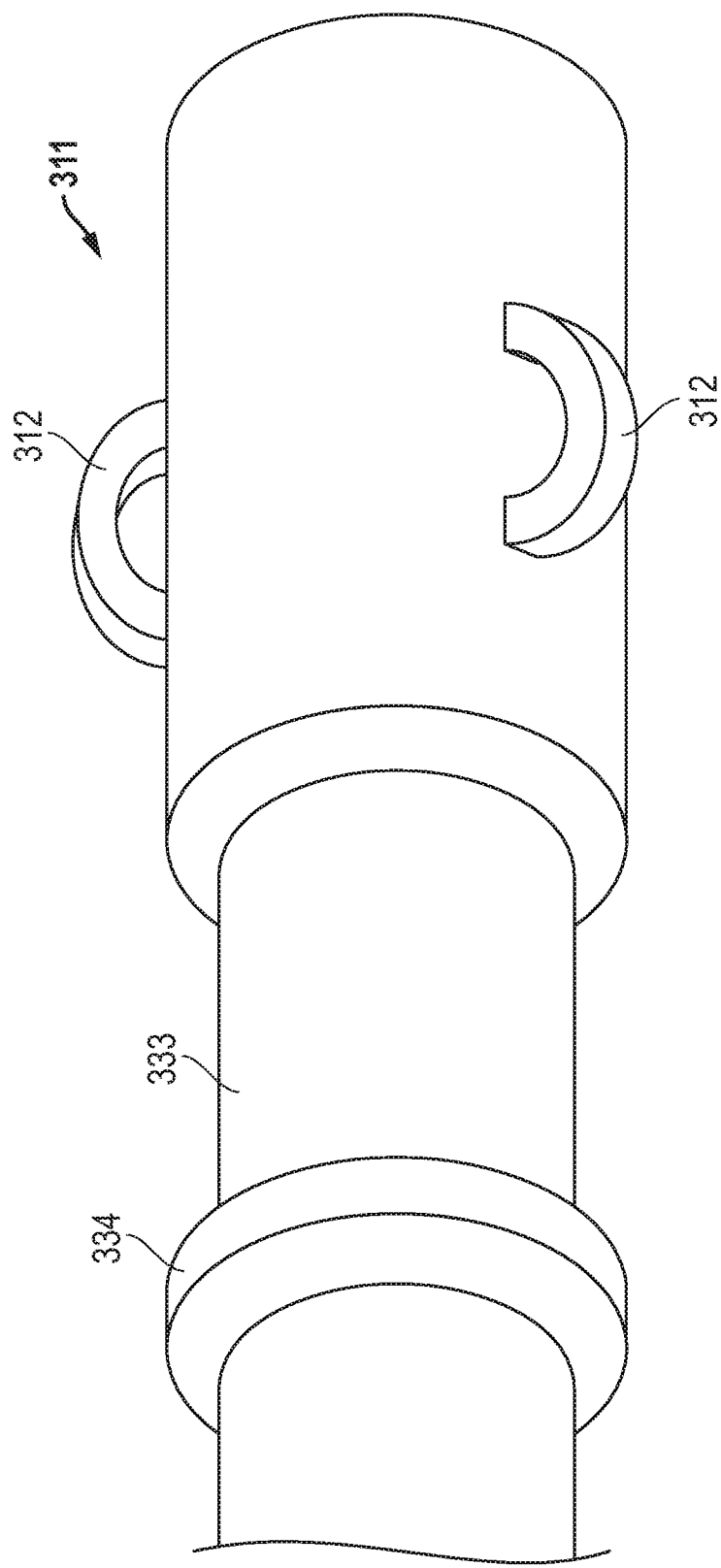
FIG. 12 is an isometric side view of another embodiment of a pipe assembly.
Figure 13:
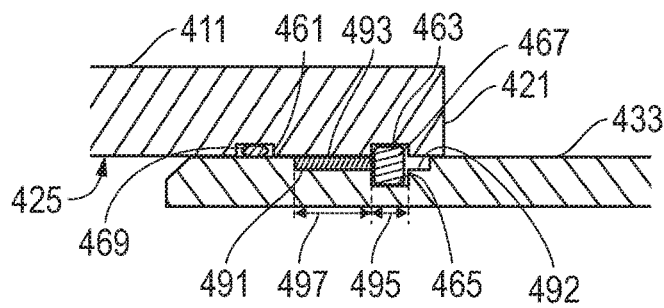
FIGS. 13-17 are sectional side views of an embodiment of a pipe system showing a progressive sequence of assembly operations.
Figure 14:
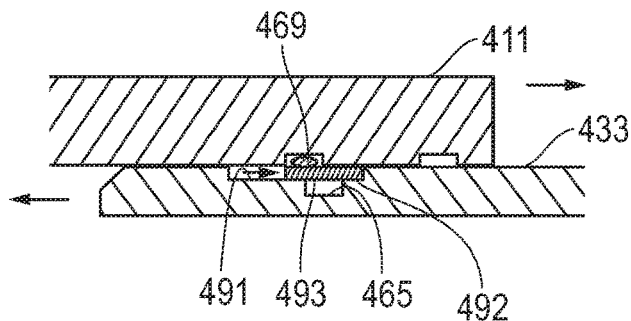
Figure 15:
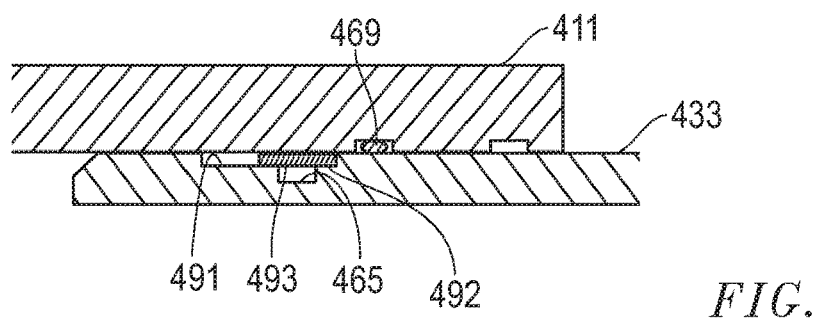

FIG. 12 depicts an embodiment of a coupling 311 comprising one or more anchors 312 (e.g., two shown). Anchors 312 can be configured to enhance movement of the coupling 311 relative to the pipe 333 using one or more tools. An example of such a tool can include a come-a-long or other device for assisting insertion of pipe 333 into coupling 311 to overcome friction therebetween. Likewise pipe 333 can include one or more features 334 for providing an anchor to better drive pipe 333 into coupling 311.

FIGS. 13-17 disclose another embodiment of a pipe system showing a progressive sequence of assembly operations. The pipe assembly (FIG. 13) can include a tubular body, such as a pipe with an integrated bell, or a coupling 411. The coupling 411 can include an axial end 421, an interior surface or bore 425 with a seal groove 461 having a seal 469, and a retainer groove 463. A retainer 467 (such as a spline) can secure the assembly together (FIG. 13) with a pipe 433 having a pipe retainer groove 465.

In addition, an exterior of the pipe 433 can have a recess 491 axially adjacent to and intersecting the retainer groove 465, as shown. A sheath 493 can be located in the recess 491, at an initial stage of assembly. In one version, the sheath 493 can comprise a continuous band formed from a polymer and having a thin, flat radial profile (relative to an axis of the pipe), as shown. The sheath 493 can completely circumscribe the recess 491. In an example, the pipe retainer groove 465 has a retainer groove axial length 495 (FIG. 13), and the recess 491 has a recess axial length 497 that is greater than the retainer groove axial length 495. The sheath 493 can be configured to have a sheath axial length that is equal to or less than the recess axial length 497 of recess 491. In this way, the sheath 493 can be configured to not interfere with the retainer 467 in retainer grooves 463, 465 during normal operation of the pipe assembly. In another version, a second recess 492 can be provided opposite recess 491 with pipe retainer groove 465 there between.

Embodiments of a method of forming or un-forming (e.g., disassembling) a pipe assembly also are disclosed. For example, the method can include providing a coupling 411 with an axis, a bore 425, a coupling retainer groove 463 and a seal groove 461 having a seal 469, a pipe 433 having a pipe retainer groove 465, a recess 491 with a band 493, and the retainer 467 in the retainer grooves 463, 465. The method can include removing the retainer 467 from the pipe assembly, and then axially moving at least one of the coupling 411 or the pipe 433 (FIG. 14) relative to each other such that the pipe 433 is located deeper in the bore 425 than it was in FIG. 13. Versions of the method can comprise contacting the band 493 with the seal 469 such that the seal 469 frictionally engages and axially slides the band 493 away from the recess 491 and over the pipe retainer groove 465, without damaging the seal 469. In this way, the assembly can be configured such that the seal 469 does not enter the pipe retainer groove 465 as the seal 469 axially passes (FIG. 15) and is radially external to the pipe retainer groove 465. In addition, the method can include moving at least one of the coupling 411 and the pipe 433 relative to each other in an axially opposite direction (FIG. 16) such that the pipe 433 begins exiting the bore 425. Embodiments of the method can include contacting the band 493 with the seal 469 such that the seal 469 again frictionally engages and axially slides the band 493 back toward the recess 491 and exposes the pipe retainer groove 465, so that the seal 469 does not enter the pipe retainer groove 465 as the seal 469 axially passes (FIG. 17) the pipe retainer groove 465.

Figure 16:
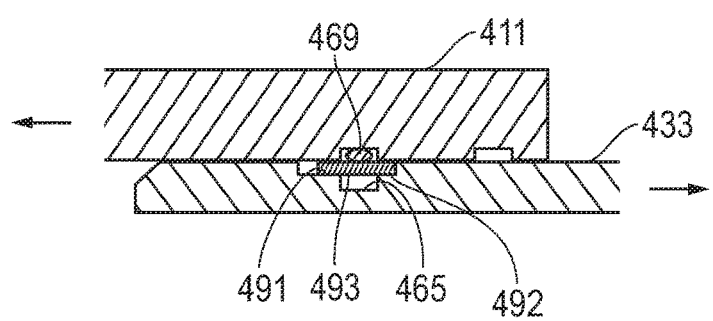
Figure 17:
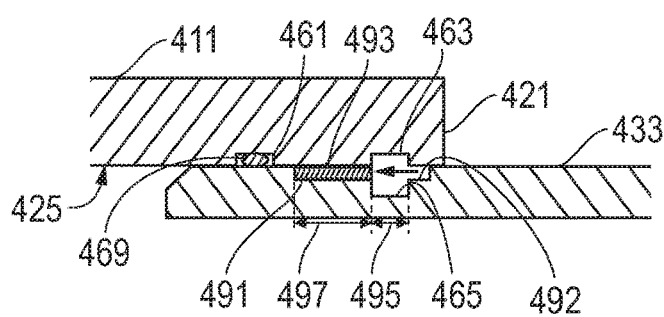

In some examples, the method can comprise axially sliding the band 493 to a second recess 492 located opposite the recess 491 with the pipe retainer groove 465 between the recess 491 and the second recess 492. Versions of the band 493 can span at least a portion of the recess 491, the pipe retainer groove 465 and the second recess 492 (FIG. 16). In another version, the method can comprise axially sliding the band 493 out of the second recess 492, such that the band 493 comes to rest only in the recess 491 and the band 493 does not span the pipe retainer groove 465 or the second recess 492.

Other versions can include one or more of the following embodiments:

Embodiment 1

A coupling for forming a joint with at least two pipes, the coupling comprising:
a coupling body having an axis, an axial length, an axial center, axial ends and an inner surface comprising an inner diameter that is substantially constant over an entirety of the axial length; and
a single shoulder protruding radially inward relative to the axis from the inner surface, such that the inner surface has no other shoulders, and the single shoulder is not axially aligned with the axial center of the coupling body.

Embodiment 2

The coupling of any of these embodiments, wherein, in an installed configuration, the single shoulder is configured to substantially remain in contact with only one of the pipes, such that another of the pipes is free of contact with the single shoulder.

Embodiment 3

The coupling of any of these embodiments, wherein an exterior of the coupling body comprises visual indicia to indicate a location of the single shoulder from the exterior of the coupling.

Embodiment 4

The coupling of any of these embodiments, wherein the visual indicia comprises text configured to describe pipe position, and instructions for pipe installation and pipe removal.

Embodiment 5

The coupling of any of these embodiments, wherein the pipes comprise visual indicia configured to indicate correct depth of axial insertion of the pipes in the coupling.

Embodiment 6

The coupling of any of these embodiments, wherein the visual indicia comprise shallow grooves circumscribing the pipes on axial ends thereof.

Embodiment 7

The coupling of any of these embodiments, wherein an axial centerline of the single shoulder is axially spaced apart from a first axial end by a first distance, the axial centerline of the single shoulder is axially spaced apart from a second axial end by a second distance, and the second distance is at least about twice the first distance.

Embodiment 8

The coupling of any of these embodiments, wherein an axial centerline of the single shoulder is axially spaced apart from the axial center of the coupling by at least about 1% of the coupling axial length, at least about 5%, at least about 10%, at least about 20%, or at least about 25%; and not greater than about 50%, not greater than about 45%, not greater than about 40%, not greater than about 35%, or not greater than about 30%.

Embodiment 9

The coupling of any of these embodiments, wherein the coupling comprises a straight coupling for only two pipes or a tee for at least three pipes.

Embodiment 10

The coupling of any of these embodiments, wherein the coupling comprises at least one of a fitting, a plug and a sweep.

Embodiment 11

The coupling of any of these embodiments, wherein the single shoulder comprises a mechanical stop comprising one of a rectangular hard stop and a chamfered stop.

Embodiment 12

The coupling of any of these embodiments, wherein the coupling body is configured to freely axially release the pipes from the axial ends from which the pipes are configured to protrude.

Embodiment 13

The coupling of any of these embodiments, wherein the coupling body comprises at least one of a seal groove and a retaining ring groove.

Embodiment 14

The coupling of any of these embodiments, wherein the coupling body comprises retaining ring grooves and seal grooves, each of the pipes comprises only a pipe retaining ring groove but not a pipe seal groove, and the coupling is configured to retain the pipes with retaining rings in an installed configuration.

Embodiment 15

The coupling of any of these embodiments, wherein no other fittings are required to form the joint between the coupling and the pipes other than retaining rings and seals.

Embodiment 16

The coupling of any of these embodiments, wherein the retaining rings must be installed from an exterior of the coupling.

Embodiment 17

The coupling of any of these embodiments, wherein the coupling and the pipes are not threaded.

Embodiment 18

The coupling of any of these embodiments, wherein the coupling is configured to not prevent rotation of the pipes relative to each other and to the coupling.

Embodiment 19

The coupling of any of these embodiments, wherein the single shoulder is configured to limit axial insertion of both pipes, such that the pipes are configured to never make contact with each other inside the coupling due to the presence of the single shoulder.

Embodiment 20

The coupling of any of these embodiments, wherein the pipes have a substantially constant outer diameter, other than axial tips thereof, which can be chamfered.

Embodiment 21

The coupling of any of these embodiments, wherein the coupling body is injection molded or extruded and machined.

Embodiment 22

The coupling of any of these embodiments, wherein the pipes are configured to be identical to each other.

Embodiment 23

A pipe system, comprising:
a coupling having an axis, axial ends, an interior and an axial-facing portion in the interior; and
at least two pipes configured to be inserted into different axial ends of the coupling and secured therein with retaining rings, the axial-facing portion of the coupling is configured to substantially remain in contact with only one of the pipes, and another one of the pipes does not axially abut, either directly or indirectly, any axial-facing portion of the coupling in the installed position other than through a respective retaining ring, such that said another one of the pipes only radially abuts the coupling with respect to the axis.

Embodiment 24

The pipe system of any of these embodiments, wherein the axial-facing portion comprises the only axial-facing portion in the interior of the coupling other than retaining ring grooves and seal grooves.

Embodiment 25

The pipe system of any of these embodiments, wherein the coupling comprises an inner diameter that is substantially constant over an entirety of the axial length other than the retaining ring and seal grooves.

Embodiment 26

The pipe system of any of these embodiments, wherein the axial-facing portion comprises a single shoulder protruding radially inward relative to the axis from the interior, such that the interior has no other shoulders.

Embodiment 27

The pipe system of any of these embodiments, wherein the axial-facing portion is not axially aligned with an axial center of the coupling.

Embodiment 28

The pipe system of any of these embodiments, wherein an exterior of the coupling comprises visual indicia to indicate a location of the axial-facing portion from the exterior of the coupling.

Embodiment 29

The pipe system of any of these embodiments, wherein the visual indicia comprises text configured to describe pipe position.

Embodiment 30

The pipe system of any of these embodiments, wherein the visual indicia comprises instructions for pipe installation and pipe removal.

Embodiment 31

The pipe system of any of these embodiments, wherein the pipes comprise visual indicia configured to indicate correct depth of axial insertion of the pipes in the coupling.

Embodiment 32

The pipe system of any of these embodiments, wherein the visual indicia comprises a shallow groove.

Embodiment 33

The pipe system of any of these embodiments, wherein the visual indicia comprise shallow grooves circumscribing each pipe adjacent axial ends thereof.

Embodiment 34

The pipe system of any of these embodiments, wherein an axial centerline of the axial-facing portion of the coupling is axially spaced apart from a first axial end of the coupling by a first distance, the axial centerline of the axial-facing portion is axially spaced apart from a second axial end of the coupling by a second distance, and the second distance is at least about twice the first distance.

Embodiment 35

The pipe system of any of these embodiments, wherein an axial centerline of the axial-facing portion is axially spaced apart from an axial center of the coupling by at least about 1% of the coupling axial length, at least about 5%, at least about 10%, at least about 20%, or at least about 25%; and not greater than about 50%, not greater than about 45%, not greater than about 40%, not greater than about 35%, or not greater than about 30%.

Embodiment 36

The pipe system of any of these embodiments, wherein the coupling comprises a straight coupling for only two pipes or a tee for at least three pipes.

Embodiment 37

The pipe system of any of these embodiments, wherein the coupling comprises at least one of a fitting, a plug and a sweep.

Embodiment 38

The pipe system of any of these embodiments, wherein the axial-facing portion comprises a mechanical stop that is chamfered in both axial directions.

Embodiment 39

The pipe system of any of these embodiments, wherein the coupling body is configured to freely axially release the pipes from the axial ends from which the pipes are configured to protrude.

Embodiment 40

The pipe system of any of these embodiments, wherein the coupling comprises at least one of a seal groove and a retaining ring groove.

Embodiment 41

The pipe system of any of these embodiments, wherein the coupling comprises retaining ring grooves and seal grooves, each of the pipes comprises only a pipe retaining ring groove but not a pipe seal groove, and the coupling is configured to retain the pipes with splines in an installed configuration.

Embodiment 42

The pipe system of any of these embodiments, wherein no other fittings are required to form a pipe assembly other than retaining rings and seals.

Embodiment 43

The pipe system of any of these embodiments, wherein the retaining rings must be installed from an exterior of the coupling.

Embodiment 44

The pipe system of any of these embodiments, wherein the coupling and the pipes are not threaded.

Embodiment 45

The pipe system of any of these embodiments, wherein the coupling is configured to not prevent rotation of the pipes relative to each other and to the coupling.

Embodiment 46

The pipe system of any of these embodiments, wherein the axial-facing portion is configured to limit axial insertion of both pipes, such that the pipes are configured to never make contact with each other inside the coupling due to the presence of the axial-facing portion.

Embodiment 47

The pipe system of any of these embodiments, wherein the pipes have a substantially constant outer diameter, other than axial tips thereof, which can be chamfered.

Embodiment 48

The pipe system of any of these embodiments, wherein the coupling is injection molded and is not extruded or machined.

Embodiment 49

The pipe system of any of these embodiments, wherein the pipes are configured to be identical to each other.

Embodiment 50

A coupling, comprising:
a coupling body having an axis, first and second axial ends, a first pipe axial insertion depth, a second pipe axial insertion depth, and retaining ring grooves, and the coupling body is configured to directly physically engage two identical pipes; and
the second pipe axial insertion depth is at least about double the first pipe axial insertion depth.

Embodiment 51

A pipe system, comprising:
a coupling having an axis, retaining ring grooves, a first pipe axial insertion depth, a second pipe axial insertion depth, and the second pipe axial insertion depth is at least about twice the first pipe axial insertion depth; and
first and second pipes configured to be axially positioned in the first and second pipe axial insertion depths, respectively, and configured to be secured with retaining rings to the coupling.

Embodiment 52

A pipe assembly, comprising:
a coupling having an axis, retaining ring grooves, a first pipe axial insertion depth, a second pipe axial insertion depth, and the second pipe axial insertion depth is at least about twice the first pipe axial insertion depth; and
first and second pipes axially positioned in the first and second pipe axial insertion depths, respectively, and secured to the coupling with retaining rings.

Embodiment 53

A pipe system, comprising
a coupling having an axis, an axial length, an axial center, an interior with an inner diameter that is substantially constant over an entirety of the axial length, and a single shoulder protrudes radially inward from the inner diameter, such that the coupling has no other shoulders in the interior, and the single shoulder is not axially aligned with the axial center of the coupling; and at least two pipes configured to be mounted to the coupling.

Embodiment 54

A method of replacing pipe in a pipe assembly, the method comprising:

providing the pipe assembly with an axis and a plurality of pipes secured to a plurality of couplings with retaining rings;

releasing the retaining rings from a selected coupling having a good pipe and a bad pipe in need of replacement, and releasing the retaining ring from an adjacent coupling joined to the bad pipe;

axially sliding the selected coupling over the good pipe until the good pipe contacts a shoulder in the selected coupling, such that the bad pipe is exposed from the selected coupling;

moving the bad pipe off-axis from the selected coupling, and removing the bad pipe from the adjacent coupling; and then installing a new pipe, in place of the bad pipe, by inserting the new pipe into the adjacent coupling, moving the new pipe on-axis with the selected coupling, and axially sliding the selected coupling onto the new pipe.

Embodiment 55

A method of replacing pipe in a pipe assembly, the method comprising:

providing the pipe assembly with an axis and a plurality of pipes secured to a plurality of couplings with retaining rings;

releasing the retaining rings from a selected coupling having a good pipe and a bad pipe in need of replacement, and releasing the retaining rings from an adjacent coupling joined to the bad pipe, the adjacent coupling having a second good pipe;

axially sliding the selected coupling over the good pipe until the good pipe contacts a shoulder in the selected coupling, and axially sliding the adjacent coupling over the second good pipe until the second good pipe contacts a second shoulder in the adjacent coupling, such that the bad pipe is exposed from the selected coupling and the adjacent coupling;

removing the bad pipe from the selected coupling and the adjacent coupling; and then installing a new pipe, in place of the bad pipe, by axially sliding the selected coupling and the adjacent coupling onto the new pipe.

Embodiment 56

A method of replacing a component in a pipe assembly, the method comprising:

providing the pipe assembly with an axis and a plurality of pipes secured to a plurality of components with retaining rings;

releasing the retaining rings from a bad component in need of replacement, the bad component having first and second pipes;

axially sliding the bad component over the first pipe until the first pipe contacts a shoulder in the bad component, such that the second pipe is exposed from the bad component;

moving the second pipe off-axis relative to the bad component;

removing the bad component from the first pipe; and then installing a new component, in place of the bad component, by axially inserting the new component onto the first pipe, repositioning the second pipe on-axis relative to the new component, and axially sliding the new component onto the second pipe.

Embodiment 57

The coupling of any of these embodiments, wherein the coupling body comprises retaining ring grooves, each of the pipes comprises a pipe retaining ring groove and a pipe seal groove, and the coupling is configured to retain the pipes with retaining rings in an installed configuration.

Embodiment 58

The coupling of any of these embodiments, wherein the pipes are configured to make contact with each other inside the coupling despite the presence of the single shoulder.

Embodiment 59

The coupling of any of these embodiments, wherein the coupling body comprises one of a straight coupling, an elbow and a tee.

Embodiment 60

The coupling of any of these embodiments, wherein an axial center of the coupling body comprises a tapped hole configured for connection to a component.

Embodiment 61

The coupling of any of these embodiments, wherein the tapped hole is configured to be plugged when the component is not used, and the component comprises a tee or a wye.

Embodiment 62

The coupling of any of these embodiments, wherein the coupling body comprises an anchor configured to enhance movement of the coupling relative to the pipes using tools.

Embodiment 63

A pipe assembly, comprising:

a coupling having a tubular profile with an axis, coupling axial ends, and a bore with inner seal grooves;

pipes mounted in the bore of the coupling, each pipe having a pipe axial end;

a distance A is defined as an axial overlap distance from one of the coupling axial ends to a respective pipe axial end; and a distance D is defined as an axial separation distance from one of the pipe axial ends to the single shoulder, and $D > A$.

Embodiment 64

A pipe, comprising:
a tubular body having an axis, a spline groove, a band groove axially adjacent to and radially shallower than the pipe spline groove, and a band mounted in the band groove.

Embodiment 65

The pipe of any of these embodiments, wherein the spline groove has an axial length, and the band groove has an axial length that is greater than the spline groove axial length.

Embodiment 66

The pipe of any of these embodiments, wherein the band is a continuous ring with flat radial profile and is formed from a polymer.

Embodiment 67

The pipe of any of these embodiments, wherein, when the band is mounted in the band groove, no portion of the band overlies the spline groove.

Embodiment 68

A pipe system, comprising:
a coupling having an axis, axial ends and a bore, and each axial end comprises a coupling spline groove formed in the bore, and a seal groove axially inboard of the coupling spline groove, and the seal groove is configured to house a seal; and
at least two pipes configured to be inserted into different axial ends of the coupling and be secured therein with retainers, each pipe comprises a pipe spline groove, a band groove axially adjacent to and radially shallower than the pipe spline groove, and a band mounted in the band groove.

Embodiment 69

A method of forming a pipe assembly, the method comprising:
(a) providing a coupling with an axis, a bore, a coupling spline groove and a seal groove having a seal, and a pipe having a pipe spline groove and a recess with a band;
(b) axially moving the coupling and the pipe relative to each other such that the pipe enters the bore;
(c) contacting the band with the seal such that the seal axially slides the band away from the recess and over the pipe spline groove, so that the seal does not enter the pipe spline groove as the seal axially passes the pipe spline groove;
(d) moving the coupling and the pipe relative to each other in an axially opposite direction such that the pipe begins exiting the bore; and then
(e) contacting the band with the seal such that the seal axially slides the band back toward the recess and exposes the pipe spline groove, so that the seal does not enter the pipe spline groove as the seal axially passes the pipe spline groove.

Embodiment 70

The method of any of these embodiments, wherein step (c) further comprises axially sliding the band to a second recess located opposite the recess with the pipe spline groove between the recess and the second recess, such that the band spans at least a portion of the recess, the pipe spline groove and the second recess.

Embodiment 71

The method of any of these embodiments, wherein step (e) further comprises axially sliding the band out of the second recess, such that the band comes to rest only in the recess and the band does not span the pipe spline groove or the second recess.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A pipe system, comprising:
   a coupling having an axis, axial ends, an interior and an axial-facing portion in the interior;
   at least two pipes configured to be inserted into different axial ends of the coupling and secured therein with retainers, the axial-facing portion of the coupling is configured to substantially remain in contact with only one of the pipes, and another one of the pipes does not axially abut, either directly or indirectly, any axial-facing portion of the coupling in the installed position other than through a respective retaining ring, such that said another one of the pipes only radially abuts the coupling with respect to the axis; and
   each pipe comprises a pipe retainer groove, a band groove axially adjacent to and radially shallower than the pipe retainer groove, and a band configured to be mounted in and axially movable relative to the band groove.

2. The pipe system of claim 1, wherein the pipe retainer groove has an axial length, and the band groove has a band groove axial length that is greater than the pipe retainer groove axial length.

3. The pipe system of claim 1, wherein the band is a continuous ring with flat radial profile and is formed from a polymer.

4. The pipe system of claim 1, wherein, when the band is mounted in the band groove, no portion of the band overlies the pipe retainer groove.

5. The pipe system of claim 1, wherein the axial-facing portion comprises the only axial-facing portion in the interior of the coupling other than retaining ring grooves and seal grooves.

6. The pipe system of claim 1, wherein the axial-facing portion is not axially aligned with an axial center of the coupling.

7. The pipe system of claim 1, wherein an axial centerline of the axial-facing portion of the coupling is axially spaced apart from a first axial end of the coupling by a first distance, the axial centerline of the axial-facing portion is axially spaced apart from a second axial end of the coupling by a second distance, and the second distance is at least about twice the first distance.

8. The pipe system of claim 1, wherein the axial-facing portion comprises a mechanical stop that is chamfered in both axial directions.

9. The pipe system of claim 1, wherein the retainers are configured to be installed from an exterior of the coupling.

10. The pipe system of claim 1, wherein the coupling and the pipes are not threaded.

11. The pipe system of claim 1, wherein the coupling is configured to not prevent rotation of the pipes relative to each other and to the coupling.

12. The pipe system of claim 1, wherein the axial-facing portion is configured to limit axial insertion of both pipes, such that the pipes are configured to never make contact with each other inside the coupling due to the presence of the axial-facing portion.

13. The pipe system of claim 1, wherein an axial centerline of the axial-facing portion is axially spaced apart from a first axial end by a first distance, the axial centerline of the axial-facing portion is axially spaced apart from a second axial end by a second distance, and the second distance is at least about twice the first distance; and
   the axial centerline of the axial-facing portion is axially spaced apart from the axial centerline by at least about 1% of the coupling axial length, and not greater than about 50% of the coupling axial length.

14. A pipe system, comprising:
   a coupling having an axis, axial ends and a bore, and each axial end comprises a coupling spline groove formed in the bore, and a seal groove axially inboard of the coupling spline groove, and the seal groove is configured to house a seal; and
   at least two pipes configured to be inserted into different axial ends of the coupling and be secured therein with retainers, each pipe comprises a pipe spline groove, a band groove axially adjacent to and radially shallower than the pipe spline groove, and a band configured to be mounted in and axially movable relative to the band groove.

15. The pipe system of claim 14, wherein the spline groove has an axial length, and the band groove has an axial length that is greater than the spline groove axial length.

16. The pipe system of claim 14, wherein the band is a continuous ring with flat radial profile and is formed from a polymer.

17. The pipe of system claim 14, wherein, when the band is mounted in the band groove, no portion of the band overlies the spline groove.

18. A method of forming a pipe assembly, the method comprising:
   (a) providing a coupling with an axis, a bore, a coupling spline groove and a seal groove having a seal, and a pipe having a pipe spline groove and a recess with a band;
   (b) axially moving the coupling and the pipe relative to each other such that the pipe enters the bore;
   (c) contacting the band with the seal such that the seal axially slides the band away from the recess and over the pipe spline groove, so that the seal does not enter the pipe spline groove as the seal axially passes the pipe spline groove;
   (d) moving the coupling and the pipe relative to each other in an axially opposite direction such that the pipe begins exiting the bore; and then
   (e) contacting the band with the seal such that the seal axially slides the band back toward the recess and exposes the pipe spline groove, so that the seal does not enter the pipe spline groove as the seal axially passes the pipe spline groove.

19. The method of claim 18, wherein step (c) further comprises axially sliding the band to a second recess located opposite the recess with the pipe spline groove between the recess and the second recess, such that the band spans at least a portion of the recess, the pipe spline groove and the second recess.

20. The method of claim 19, wherein step (e) further comprises axially sliding the band out of the second recess, such that the band comes to rest only in the recess and the band does not span the pipe spline groove or the second recess.

\* \* \* \* \*